United States Patent
Shimizu

(10) Patent No.: US 7,796,165 B2
(45) Date of Patent: Sep. 14, 2010

(54) IMAGE CAPTURING APPARATUS AND IMAGE CAPTURING METHOD

(75) Inventor: Masami Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/690,899

(22) Filed: Jan. 20, 2010

(65) Prior Publication Data

US 2010/0110227 A1    May 6, 2010

Related U.S. Application Data

(62) Division of application No. 11/470,462, filed on Sep. 6, 2006, now Pat. No. 7,675,558.

(30) Foreign Application Priority Data

Sep. 9, 2005    (JP) .............................. 2005-262984

(51) Int. Cl.
*H04N 5/76* (2006.01)
*G03B 17/24* (2006.01)

(52) U.S. Cl. .............. 348/231.2; 348/231.1; 348/231.8; 348/231.3; 348/231.7; 396/321

(58) Field of Classification Search ... 348/231.1–231.3, 348/231.99, 231.8, 231.7, 231.9, 333.01, 348/333.02, 333.04, 333.07, 207.1; 707/999.107; 396/321

See application file for complete search history.

(56) References Cited

U.S. PATENT DOCUMENTS

| | | | | |
|---|---|---|---|---|
| 5,640,203 A | * | 6/1997 | Wakui | 348/231.8 |
| 5,986,700 A | * | 11/1999 | Wakui | 348/231.8 |
| 6,661,454 B1 | * | 12/2003 | Hwang et al. | 348/231.1 |
| 6,701,058 B1 | * | 3/2004 | Tsubaki | 386/46 |
| 6,927,794 B2 | * | 8/2005 | Kubo et al. | 348/231.8 |
| 7,161,622 B1 | * | 1/2007 | Oinoue | 348/211.1 |
| 7,218,345 B2 | * | 5/2007 | Hatano | 348/231.1 |
| 7,236,193 B2 | * | 6/2007 | Suemoto et al. | 348/231.8 |
| 7,477,296 B2 | * | 1/2009 | Okumura | 348/231.99 |
| 7,675,558 B2 | * | 3/2010 | Shimizu | 348/231.99 |
| 2001/0004268 A1 | * | 6/2001 | Kubo et al. | 348/333.02 |
| 2006/0055791 A1 | * | 3/2006 | Morino | 348/211.2 |

FOREIGN PATENT DOCUMENTS

| | | |
|---|---|---|
| JP | 11-284894 | 10/1999 |
| JP | 2000-020093 | 1/2000 |
| JP | 2001-069384 | 3/2001 |
| JP | 2001-169224 | 6/2001 |
| JP | 2001-211356 | 8/2001 |
| JP | 2003-264729 | 9/2003 |
| JP | 2005-078279 | 3/2005 |

* cited by examiner

*Primary Examiner*—Tuan Ho
*Assistant Examiner*—Marly Camargo
(74) *Attorney, Agent, or Firm*—Fitzpatrick, Cella, Harper & Scinto

(57) ABSTRACT

An image capturing apparatus represented by digital camera 200 is capable of accessing at least two storage media. Each time one of the storage media becomes full, the image capturing apparatus switches the image data recording destination to the other storage medium. While one of the storage media is serving as the image data recording destination, image data in the other storage medium is transferred to a host unit by communication.

9 Claims, 14 Drawing Sheets

F I G. 2
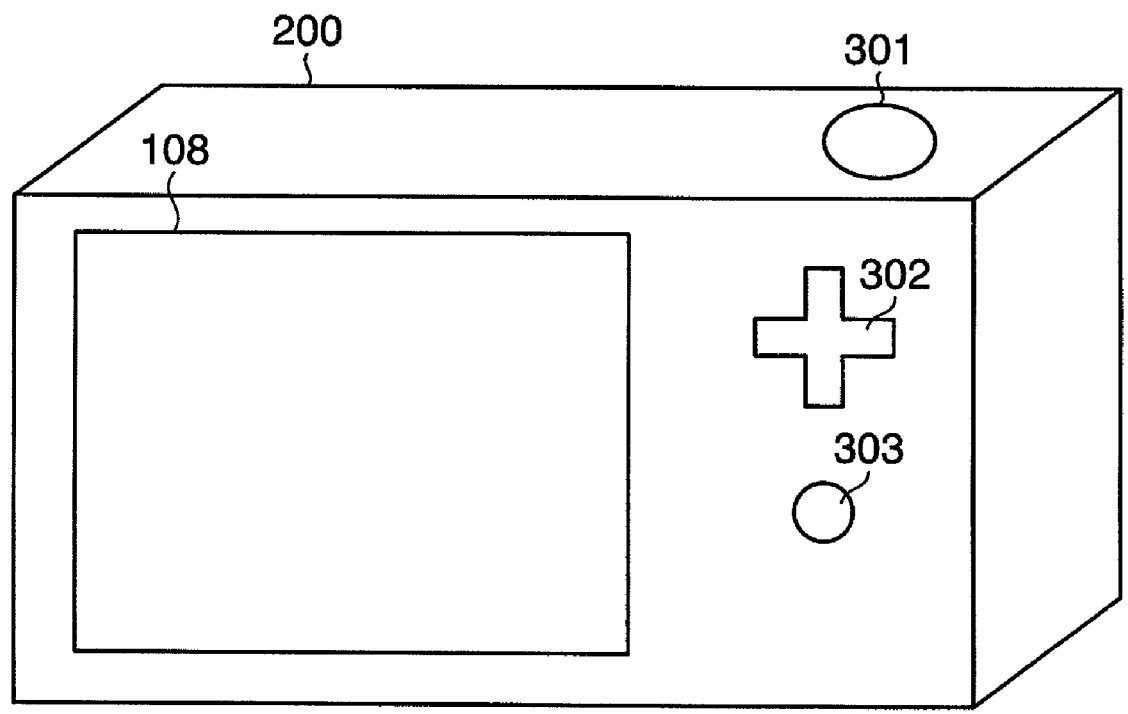

IMAGE CAPTURING APPARATUS AND IMAGE CAPTURING METHOD

This application is a divisional of U.S. patent application Ser. No. 11/470,462, filed on Sep. 6, 2006, the entire contents of which are incorporated by reference herein.

BACKGROUND OF THE INVENTION

1. Field of the Invention

The present invention relates to an image capturing apparatus having a wireless communication function, and an image capturing method employing said image capturing apparatus.

2. Description of the Related Art

Today, an image capturing apparatus having a wireless communication function has been proposed. This image capturing apparatus records captured image data in an internal or removable storage medium (hereinafter referred to as a storage medium of an image capturing apparatus) and transfers the recorded image data to an external apparatus by wireless communication. This is, for instance, disclosed in Japanese Patent Application Laid-Open (KOKAI) No. 11-284894. For the external apparatus, for instance, a personal computer (PC) is used. According to the image capturing apparatus proposed by Japanese Patent Application Laid-Open (KOKAI) No. 11-284894, image capturing can be performed without being confined by the storage capacity of a storage medium of an image capturing apparatus. The reason is in that, since an external apparatus normally comprises a storage device having a much larger capacity than that of the storage medium of the image capturing apparatus, captured image data that has been transferred to the external apparatus can be deleted from the storage medium of the image capturing apparatus.

Further proposed is an image capturing apparatus having a plurality of media (storage media) slots for sequentially recording captured image data in a plurality of media in accordance with media insertion order (e.g., Japanese Patent Application Laid-Open (KOKAI) No. 2001-169224). According to the image capturing apparatus proposed by Japanese Patent Application Laid-Open (KOKAI) No. 2001-169224, a user is able to perform image capturing without being conscious about which storage medium the captured image data is to be recorded.

In the image capturing apparatus according to Japanese Patent Application Laid-Open (KOKAI) No. 11-284894, as mentioned above deletion of transferred image data from a storage medium enables image capturing without confinement of the storage capacity of the medium. However, as recent years have seen an increased number of pixels in image capturing apparatuses and improved serial-shooting capability, there is a case where the image data transfer speed cannot catch up with the image data generation speed. Furthermore, there are user's demands for not deleting the transferred image data from a storage medium considering a case where wireless image data transfer is not properly performed. In this case, a storage medium that has exhausted its capacity needs to be exchanged to a new storage medium. However, in the image capturing apparatus proposed by Japanese Patent Application Laid-Open (KOKAI) No. 11-284894, image data recorded in the storage medium is transferred to an external apparatus by wireless communication. Therefore, even if the storage medium exhausts its capacity, the storage medium cannot be exchanged until the transfer is completed. Generally since wireless communication requires relatively long time, a user cannot perform image capturing for relatively long time.

Meanwhile, in the image capturing apparatus according to Japanese Patent Application Laid-Open (KOKAI) No. 2001-169224, even if one storage medium has exhausted its full capacity, another storage medium can record image data; therefore, a user can continue image capturing. However, wireless communication of image data is not considered.

Furthermore, neither Japanese Patent Application Laid-Open (KOKAI) No. 11-284894 nor No. 2001-169224 considers an image capturing apparatus that can record one same image data in a plurality of storage media and transfer the image data by wireless communication.

The present invention has been proposed in view of the above-described situation, and is characterized by providing a technique employed in an image capturing apparatus having a wireless communication function, which enables a user to continue image capturing even if the storage medium within the image capturing apparatus becomes full during image data transfer via wireless communication.

SUMMARY OF THE INVENTION

It is a feature of the present invention to solve the conventional problems.

According to an aspect of the present invention, there is provided with an image capturing apparatus comprising:

a recording unit adapted to record captured image data in a recording destination storage medium selected from one of first and second storage media which are inserted;

a determination unit adapted to determine whether or not an available capacity of the recording destination storage medium is less than a predetermined value;

a selection unit adapted to, in a case where the available capacity of the recording destination storage medium is less than the predetermined value as a result of the determination, select the other of the first and second storage media as the recording destination storage medium;

a transfer unit adapted to transfer at least one of the image data recorded in the first and second storage media to an external apparatus by wireless communication; and a notifying unit adapted to notify a user of an exchangeable storage medium among the first and second storage media, wherein in a case where the transfer of the transfer unit is not performed on a storage medium that is not the recording destination storage medium among the first and second storage media, the notifying unit notifies a user that the storage medium that is not the recording destination storage medium is exchangeable.

According to another aspect of the present invention, there is provided with an image capturing apparatus comprising:

a recording unit adapted to record captured image data in at least one of first and second storage media which are inserted;

a first transfer unit adapted to transfer the image data recorded in the first storage medium to an external apparatus by wireless communication;

a determination unit adapted to determine whether or not an available capacity of the first or second storage medium is less than a predetermined value;

a first recording control unit adapted to, in a case where neither the available capacity of the first nor second storage medium is less than the predetermined value as a result of the determination, control the recording unit to record the image data in both the first and second storage media; and a first exchange instruction unit adapted to instruct a user to exchange the second storage medium in a case where the available capacity of at least one of the first and second storage media is less than the predetermined value as a result of the determination, wherein the instruction by the first exchange instruction unit can be executed in parallel with the transfer executed by the first transfer unit.

According to another aspect of the present invention, there is provided with an image capturing method comprising the steps of:

recording captured image data in a recording destination storage medium selected from one of first and second storage media which are inserted;

determining whether or not an available capacity of the recording destination storage medium is less than a predetermined value;

in a case where the available capacity of the recording destination storage medium is less than the predetermined value as a result of the determination, selecting the other of the first and second storage media as the recording destination storage medium;

transferring at least one of the image data recorded in the first and second storage media to an external apparatus by wireless communication; and notifying a user of an exchangeable storage medium among the first and second storage media, wherein in the step of notifying a user of an exchangeable storage medium among the first and second storage media, in a case where the predetermined image data transfer to the external apparatus by wireless communication is not performed on a storage medium that is not the recording destination storage medium among the first and second storage media, the user is notified that the storage medium that is not the recording destination storage medium is exchangeable.

According to another aspect of the present invention, there is provided with an image capturing method comprising the steps of:

recording captured image data in at least one of first and second storage media which are inserted;

transferring the image data recorded in the first storage medium to an external apparatus by wireless communication;

determining whether or not an available capacity of the first or second storage medium is less than a predetermined value;

in a case where neither the available capacity of the first nor second storage medium is less than the predetermined value as a result of the determination, controlling the recording to record the image data in both the first and second storage media; and instructing a user to exchange the second storage medium in a case where the available capacity of at least one of the first and second storage media is less than the predetermined value as a result of the determination, wherein the instructing a user to exchange the second storage medium can be executed in parallel with the wireless communication transfer of the image data recorded in the first storage medium to the external apparatus.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing an external appearance of the digital camera;

DESCRIPTION OF THE EMBODIMENTS

Hereinafter, preferred embodiments of the present invention are described with reference to the accompanying drawings. Each of the following embodiments will help understand various concepts of the present invention including the generic, intermediate, and specific concepts.

Note that the technical scope of the present invention is defined by the scope of the patent claims, and is not limited by each of the following embodiments. Further, not all the combinations of the features described in the embodiments are necessarily essential to the solving means of the present invention.

Furthermore, the present invention is applicable to a corrected or modified case of the embodiments described below without departing from the spirit of the invention. For instance, although the following embodiments describe a digital camera incorporating a wireless communication function, the wireless communication function may be realized by, for instance, inserting a wireless interface and an antenna in an extension slot of the digital camera.

First Embodiment

Construction of Digital Camera 200

Figure 1:
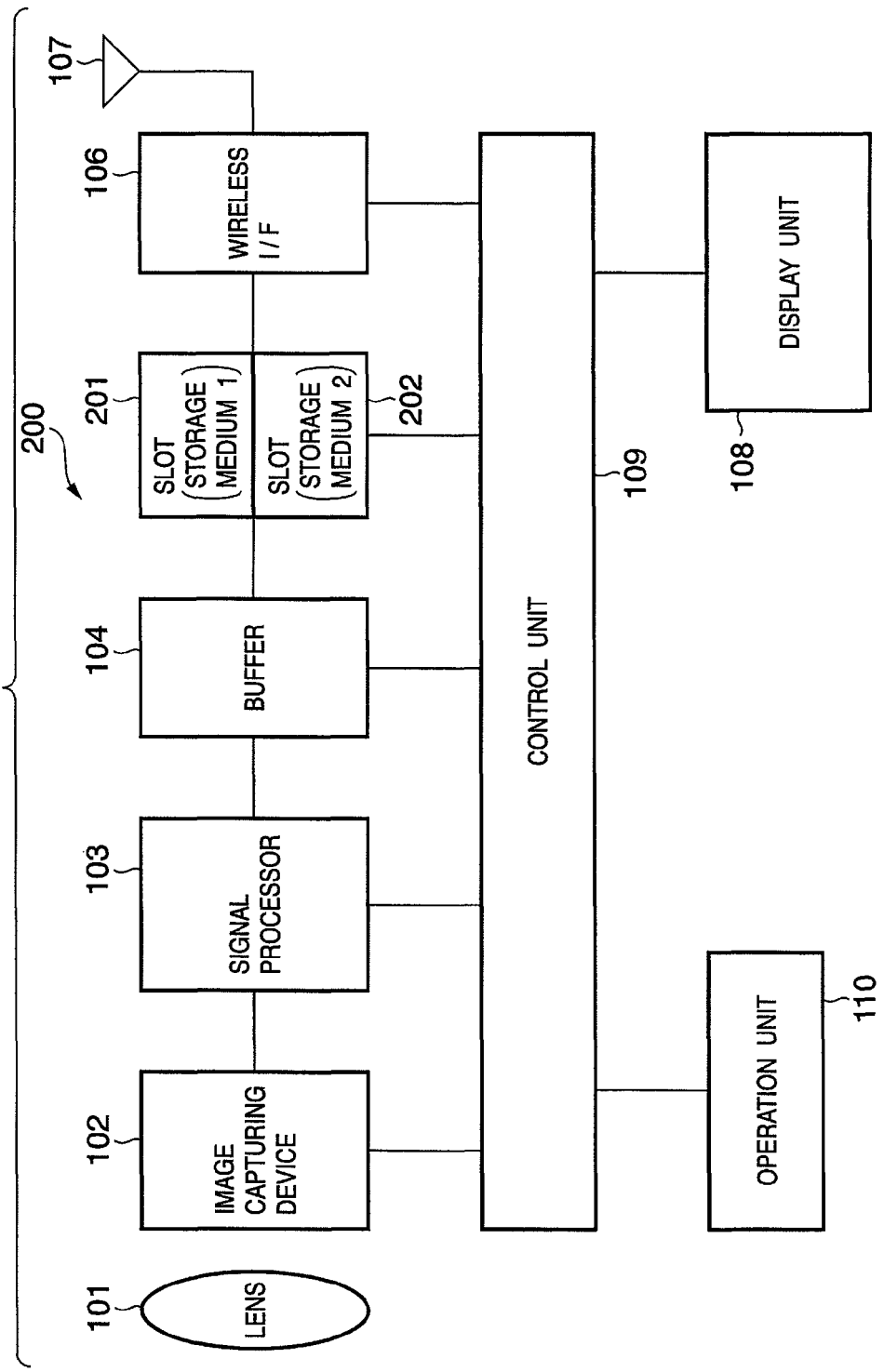
FIG. 1 is a block diagram showing a functional configuration of a digital camera serving as an image capturing apparatus, to which the present invention is applied.

FIG. 1 is a block diagram showing a functional configuration of a digital camera 200 serving as an image capturing apparatus, to which the present invention is applied.

A shooting object image, which is an image capturing target, forms an optical image on an image capturing device 102 through an optical lens 101. The image capturing device 102 is configured with a sensor such as a CCD, CMOS, or the like.

The optical image formed on the image capturing device 102 is converted from optical signals to electric signals by photoelectric conversion.

A signal processor 103 performs signal processing such as A/D conversion, noise removal, white balance processing, compression-encoding and so forth on the electric signals obtained by the image capturing device 102, and generates image data.

A buffer 104 is a volatile memory provided for temporarily recording image data.

The digital camera 200 comprises slots 201 and 202. In each of the following embodiments, descriptions are given assuming that the digital camera 200 has two slots for storage media. However, three or more slots for storage media may be provided.

A storage medium 1 can be inserted to the slot 201, and a storage medium 2 can be inserted to the slot 202.

Slots 201 and 202 are provided for inserting a storage medium (herein, storage medium 1 and 2) such as a compact flash (registered trademark) or SD memory card. Image data that has been recorded in the buffer 104 is recorded in the storage medium 1 and/or 2 and deleted from the buffer 104. Normally a plurality of image data is recordable in the storage medium 1 and 2.

A wireless I/F 106 is an interface provided for wireless communication between the image capturing apparatus in FIG. 1 and an external apparatus. Various interfaces, e.g., 32 Kbps MO digital transmission system using a PHS (Personal Handyphone System), wireless LAN, and an interface for other wireless communication techniques that will prevail in the future can be used for the wireless I/F 106.

An antenna 107 is provided for transmitting and receiving radio wave and the like in wireless communication. Image data recorded in the storage medium 1 and/or 2 is transferred to a pre-registered remote host unit (external apparatus) through the antenna 107.

Provided that the usage of the image capturing apparatus is limited to indoors, the wireless I/F 106 may adopt an IrDA communication interface using infrared light, besides radio wave. In this case, the Image capturing apparatus comprises an infrared light reception/emission unit instead of the antenna 107.

A display unit 108, which is configured with, e.g., a liquid crystal panel, displays a captured image or a menu screen of the image capturing apparatus. The display unit 108 is also used as an electronic viewfinder.

A control unit 109 controls the entire image capturing apparatus by executing a program (firmware) stored in a flash ROM (not shown).

An operation unit 110 is configured with, e.g., a shutter, menu buttons, a cross key and the like. A user can give instructions to the image capturing apparatus by operating this unit.

Note that image data recorded in the buffer 104 may be recorded in either the storage medium 1 or 2. Image data recorded in any of the storage media 1 and 2 can be transferred to an external apparatus through the wireless I/F 106.

<External Appearance of Digital Camera 200>

FIG. 2 is a view showing an external appearance of the digital camera 200. To the elements identical to those of FIG. 1, the same reference numerals are assigned and detailed descriptions are omitted. Further, FIG. 2 only shows constituent elements of the digital camera 200 that are necessary to the description of the present embodiment, thus does not show all the constituent elements.

A shutter 301, a cross key 302, and a menu button 303, which are included in the operation unit 110, are provided so that a user can perform image capturing and setting of the digital camera 200 by operating them.

<Preparation of Image Capturing>

Figure 3:
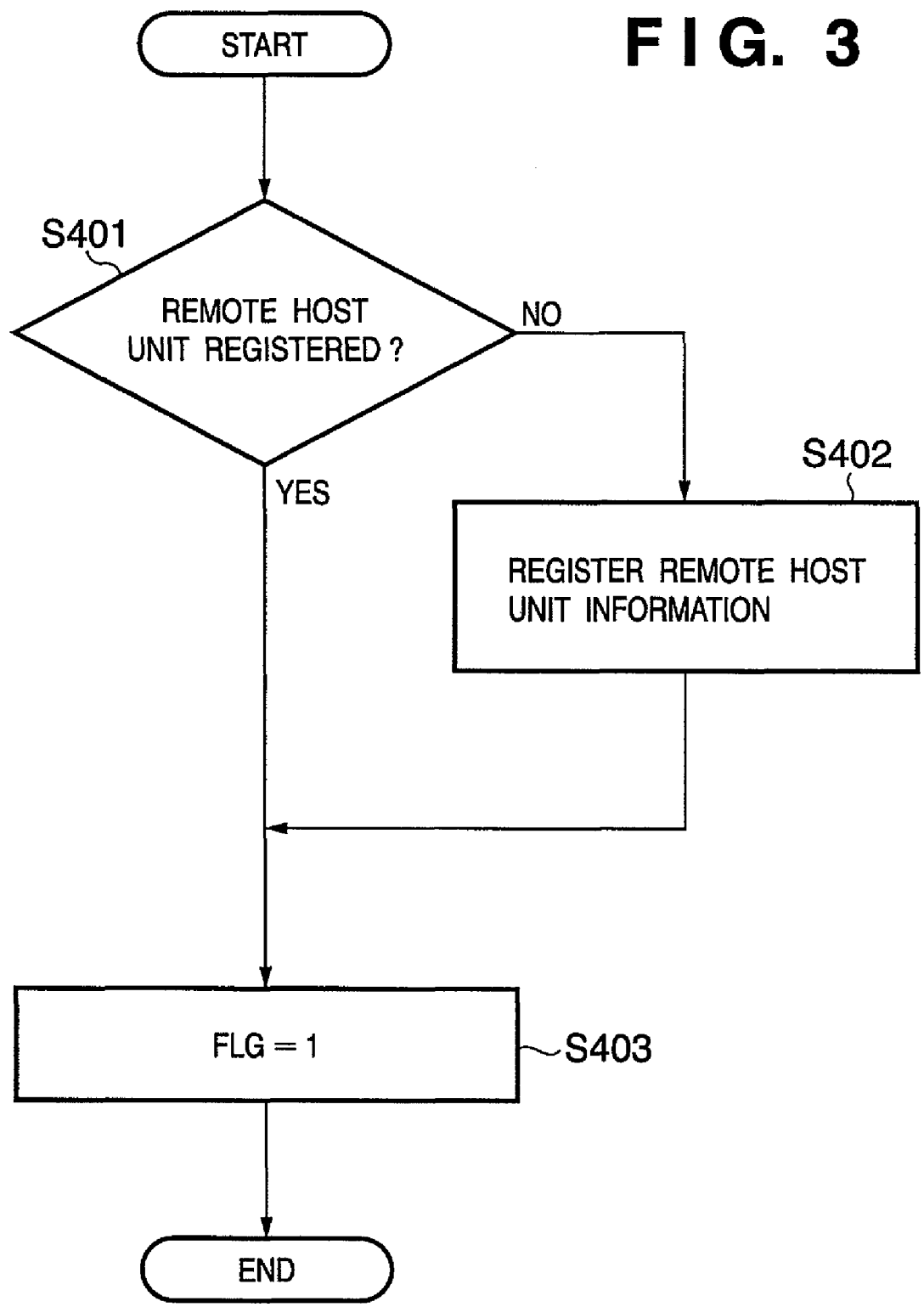
FIG. 3 is a flowchart describing preparation processing of image capturing using a digital camera.

FIG. 3 is a flowchart describing preparation processing of image capturing using the digital camera 200. The processing of this flowchart starts when the power of the digital camera 200 is turned on. Note that each processing in FIGS. 3 to 6 which will be described below is performed by executing a firmware by the control unit 109 of the digital camera 200.

In step S401, the control unit 109 determines whether or not information regarding a remote host unit (external apparatus) is registered in the SRAM (not shown). If information is not registered, the control proceeds to step S402; whereas if the information is registered, the control proceeds to step S403.

In a case of a telephone transmission system using, e.g., PHS, the information herein includes a telephone number of the destination, a transmission protocol, the user's account and password of the remote host unit, the name of the directory the image data is to be stored, and so on. In a case of using a wireless LAN for a transmission system, the information includes a transmission protocol, an address of the remote host unit (TCP/IP address or the like), the user's account and password of the remote host unit, the name of the directory the image data is to be stored, and so on.

In step S402, the control unit 109 registers the information regarding the remote host unit. For instance, the control unit 109 displays a registration menu screen on the display unit 108, and records the information inputted by a user through the operation unit 110 in the SRAM (not shown), thereby realizing the registration processing.

Figure 7:
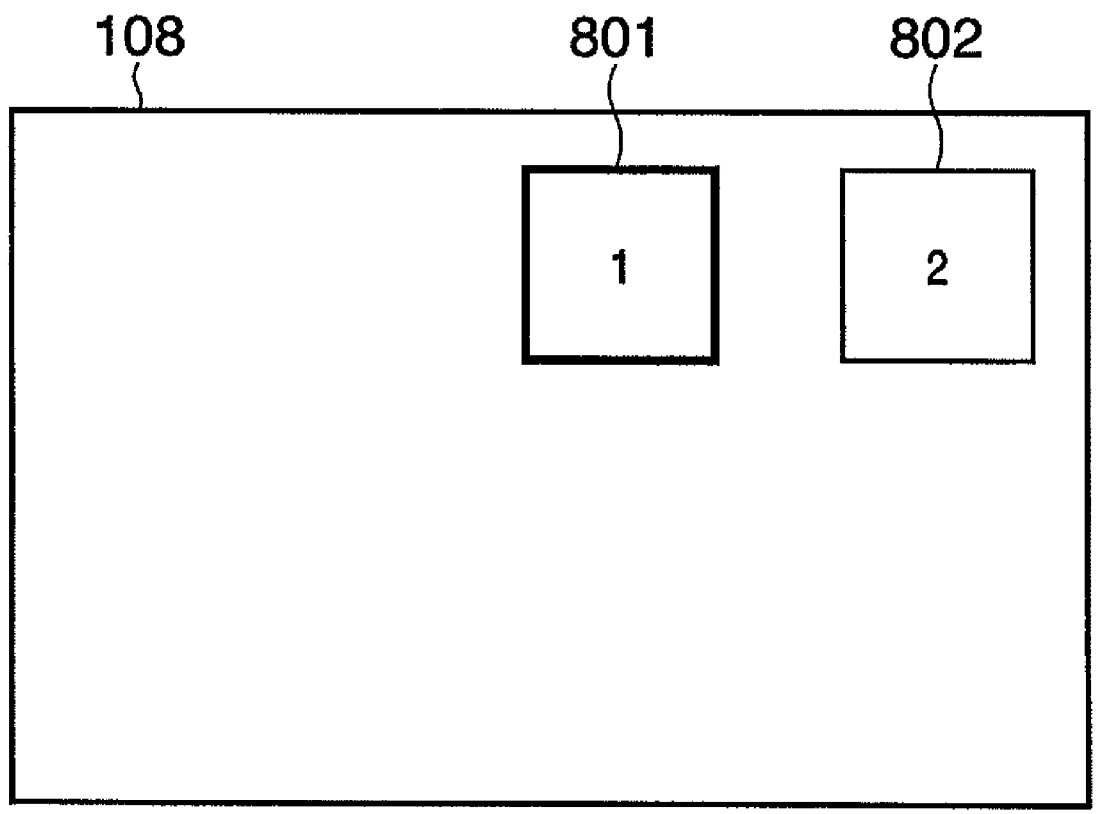
FIG. 7 is a view showing a user interface for letting a user select a storage medium that records image data.

In step S403, 1 is assigned to the variable FLG which designates a storage medium the image data is to be recorded. The value of the variable FLG can be recorded, for instance, in the SRAM (not shown). FLG=1 means that the image data is to be recorded in the storage medium 1 inserted to the slot 201. FLG=2 means that the image data is to be recorded in the storage medium 2 inserted to the slot 202. The control unit 109 displays the setting of the variable FLG on the display unit 108. FIG. 7 shows the screen displayed on the display unit 108. Numerals 801 and 802 denote icons that represent the storage media 1 and 2 respectively. When variable FLG is 1, the icon 801 representing the storage medium 1 is emphasized by a heavy-line frame as shown in FIG. 7. When variable FLG is 2, the icon 802 representing the storage medium 2 is emphasized by a heavy-line frame.

Note that although not shown in the drawing, even in a case where the information regarding the remote host unit has already been registered in step S401, the information can be changed in order to switch the communication target to another remote host unit.

Further, in step S403, the initial value of FLG may be 2 instead of 1.

<Processing Flow of Image Capturing>

Figure 4A:
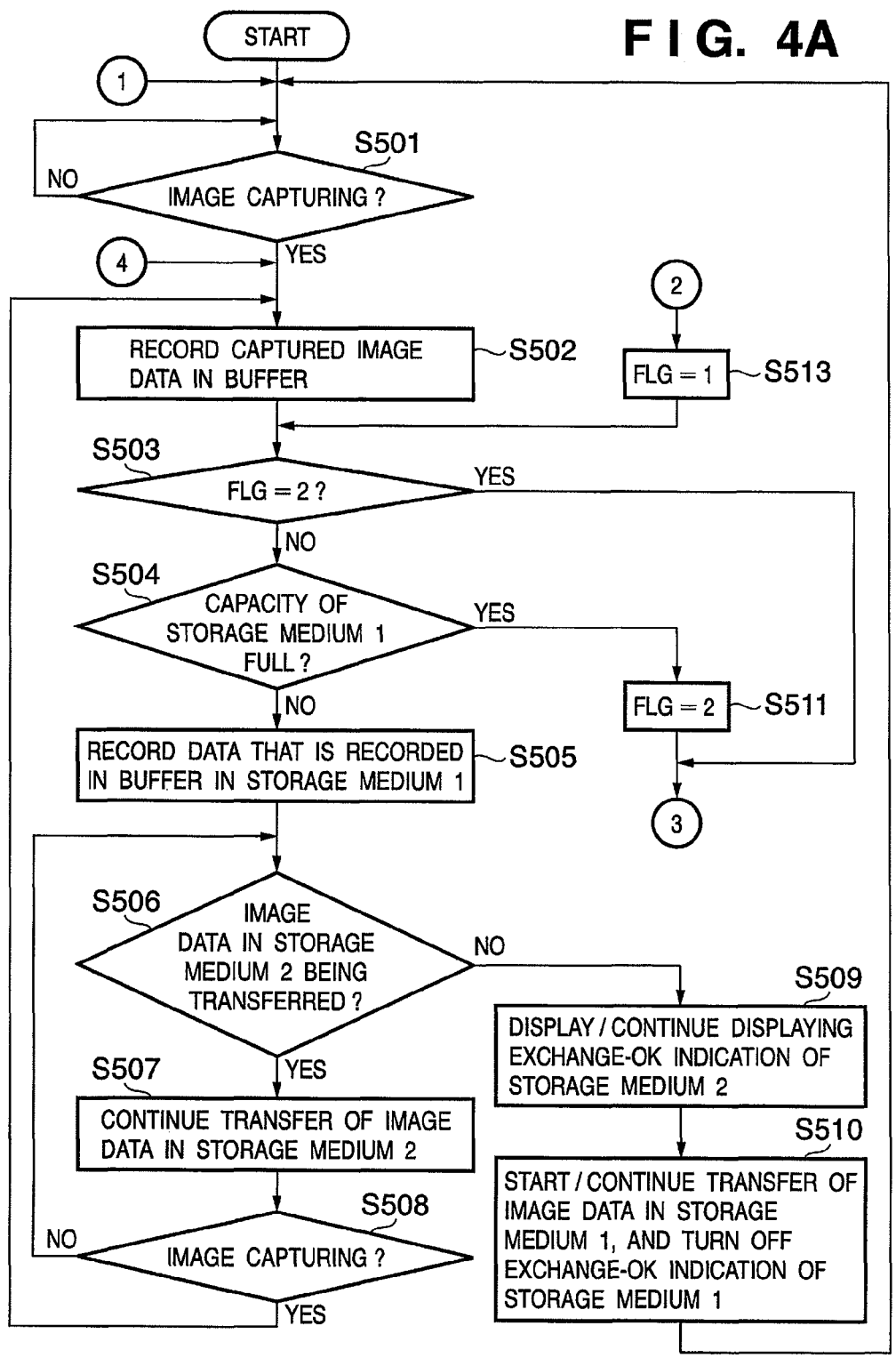
FIGS. 4A and 4B are a flowchart describing image capturing processing by a digital camera according to the first embodiment.
Figure 4B:
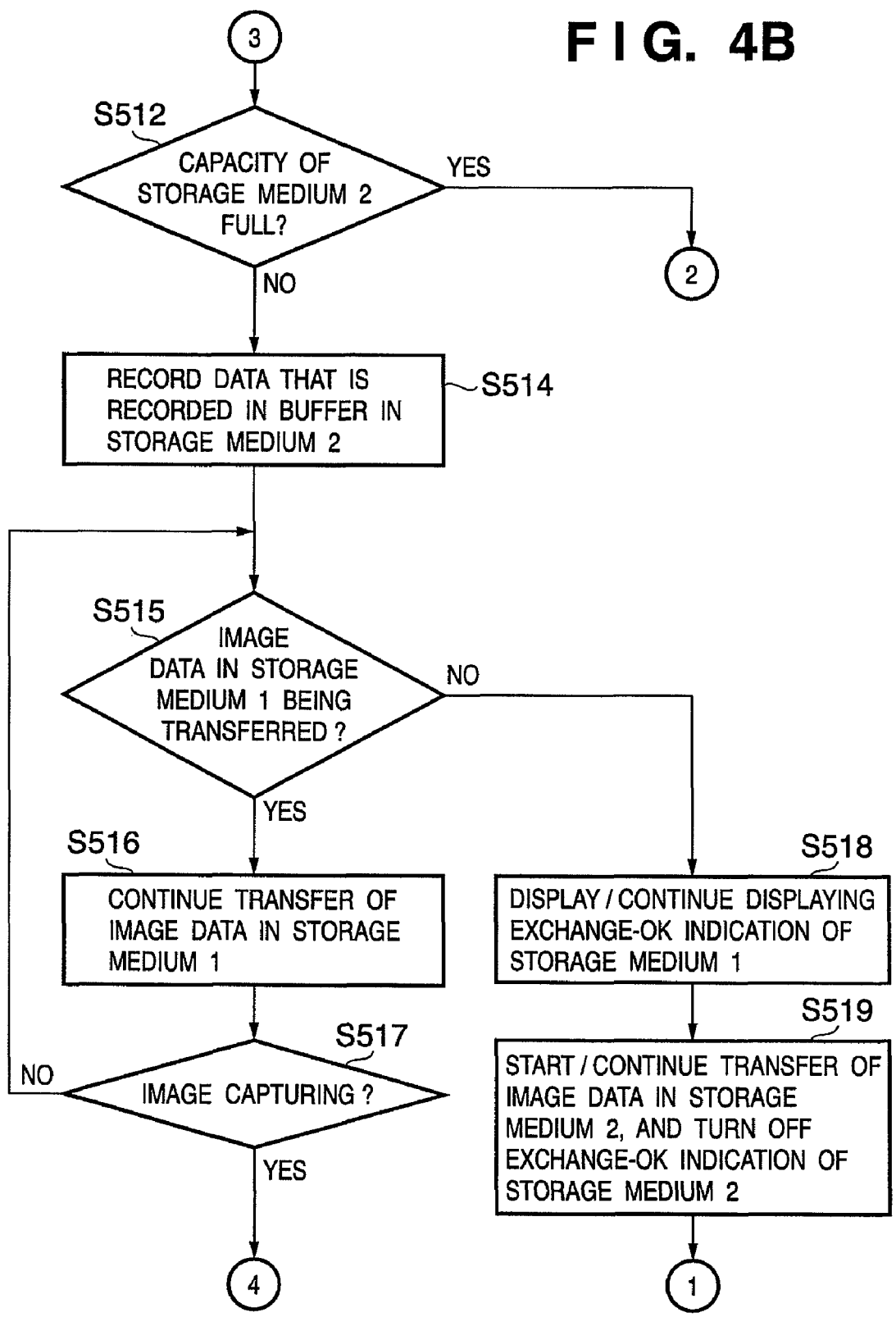

FIGS. 4A and 4B are a flowchart describing image capturing processing by the digital camera 200 according to the first embodiment.

In step S501, the control unit 109 waits for reception of an image capturing designation such as depression of the shutter 301 or the like.

In step S502, the control unit 109 records captured image data in the buffer 104.

In step S503, the control unit 109 determines whether or not FLG=2 stands. If FLG=2 stands, the control proceeds to step S512; whereas if FLG=2 does not stand, the control proceeds to step S504.

In step S504, the control unit 109 determines whether or not the capacity of the storage medium 1 is full, i.e., whether or not the storage medium 1 has enough space for recording the image data which has been recorded in the buffer 104 in step S502. The capacity of the storage medium 1 (or 2) being full means that the space of the storage medium is less than a predetermined value. This is similarly applicable to the following descriptions. If the storage medium is full, the control proceeds to step S511; whereas if the storage medium is not full, the control proceeds to step S505.

In step S505, the control unit 109 records the image data, which has been recorded in the buffer 104 in step S502, in the storage medium 1 and deletes the image data from the buffer 104.

In step S506, the control unit 109 determines whether or not image data recorded in the storage medium 2 is being transferred to the remote host unit by wireless communication. If so, the control proceeds to step S507; whereas if not, the control proceeds to step S509.

Figure 8:
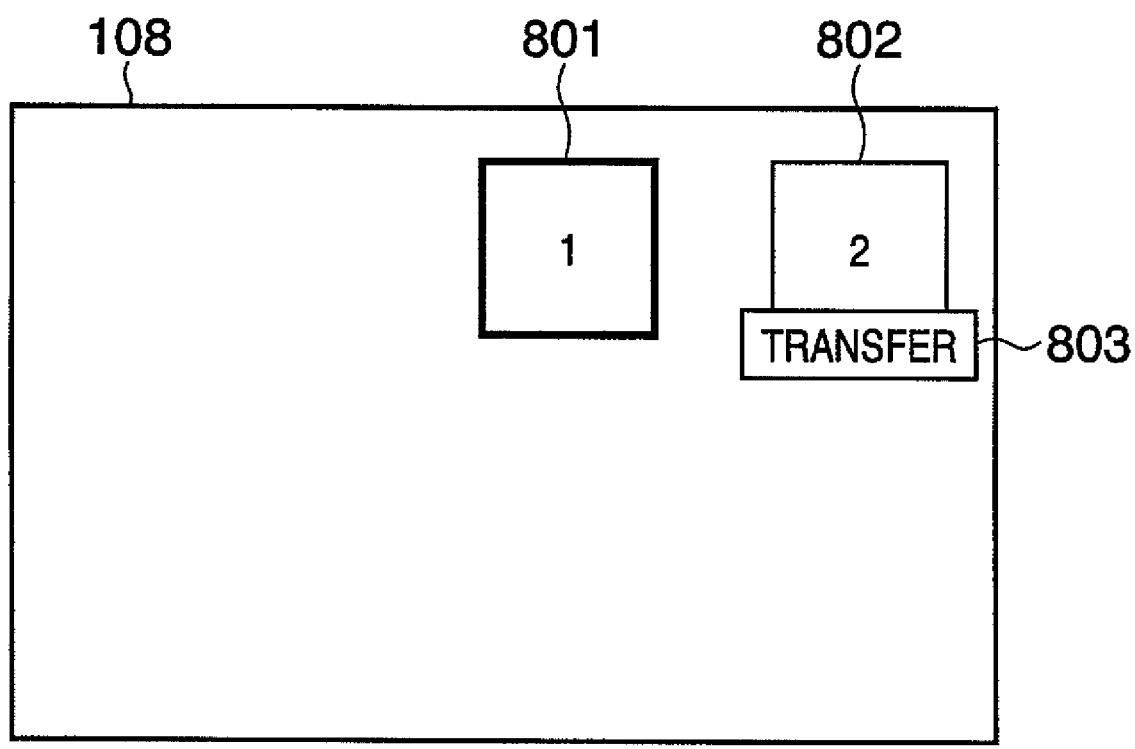
FIG. 8 is a view showing an example of a display for notifying a user that image data is being transferred from a storage medium to a remote host unit.

In step S507, the control unit 109 continues transferring of the image data recorded in the storage medium 2 to the remote host unit. While the image data recorded in the storage medium 2 is transferred, the control unit 109 displays on the display unit 108 a message indicating that the transferring is in progress. Numeral 803 in FIG. 8 shows an example thereof.

In step S508, the control unit 109 determines whether or not an image capturing designation, such as depression of the shutter 301, is received. If an image capturing designation is received, the control returns to step S502 and the similar processing is repeated. If an image capturing designation is not received, the control returns to step S506 and the similar processing is repeated.

Figure 9:
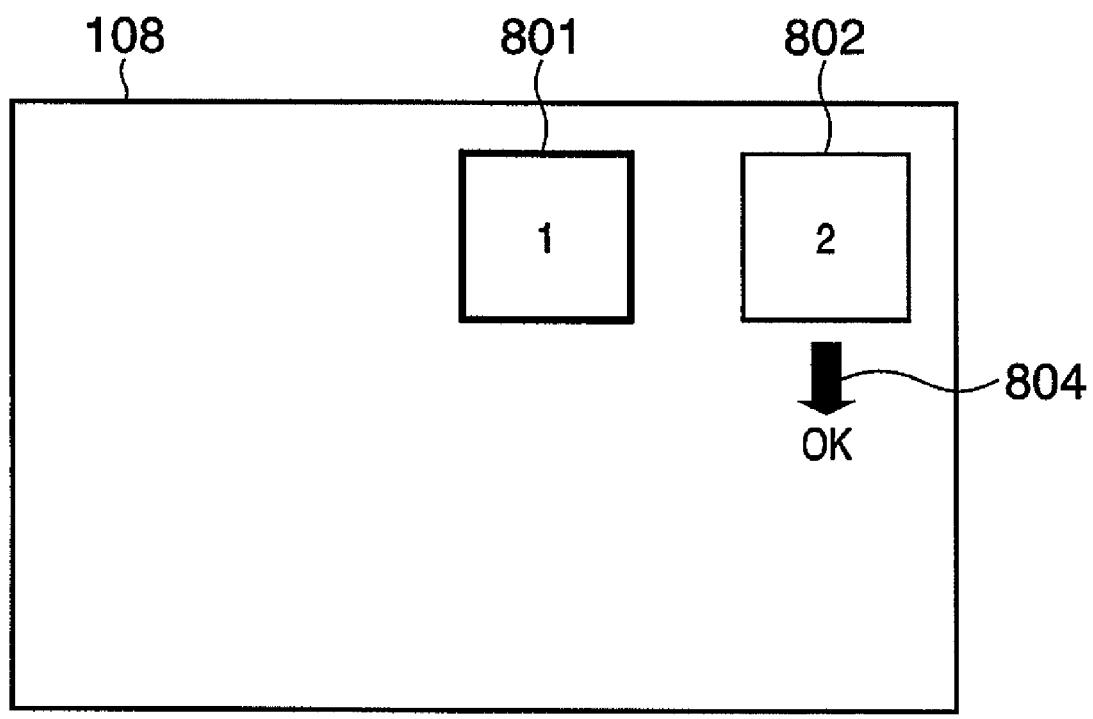
FIG. 9 is a view showing an example of a display for notifying a user that a storage medium inserted in a slot of a digital camera can be exchanged.

When the control unit 109 determines in step S506 that the image data recorded in the storage medium 2 is not being transferred to the remote host unit by wireless communication, step S509 is executed. In step S509, the control unit 109 displays on, e.g., the display unit 108, that the storage medium 2 is exchangeable (exchange-OK indication). If the exchange-OK indication has already been displayed, the indication display is continued. An example of the exchange-OK indication is shown in numeral 804 in FIG. 9. Note that the exchange-OK indication does not necessarily have to be an "indication" that appeals to the eyes, but any method such as sound may be employed as long as the user can acknowledge the message. This is similarly applicable to the following descriptions.

Figure 10:
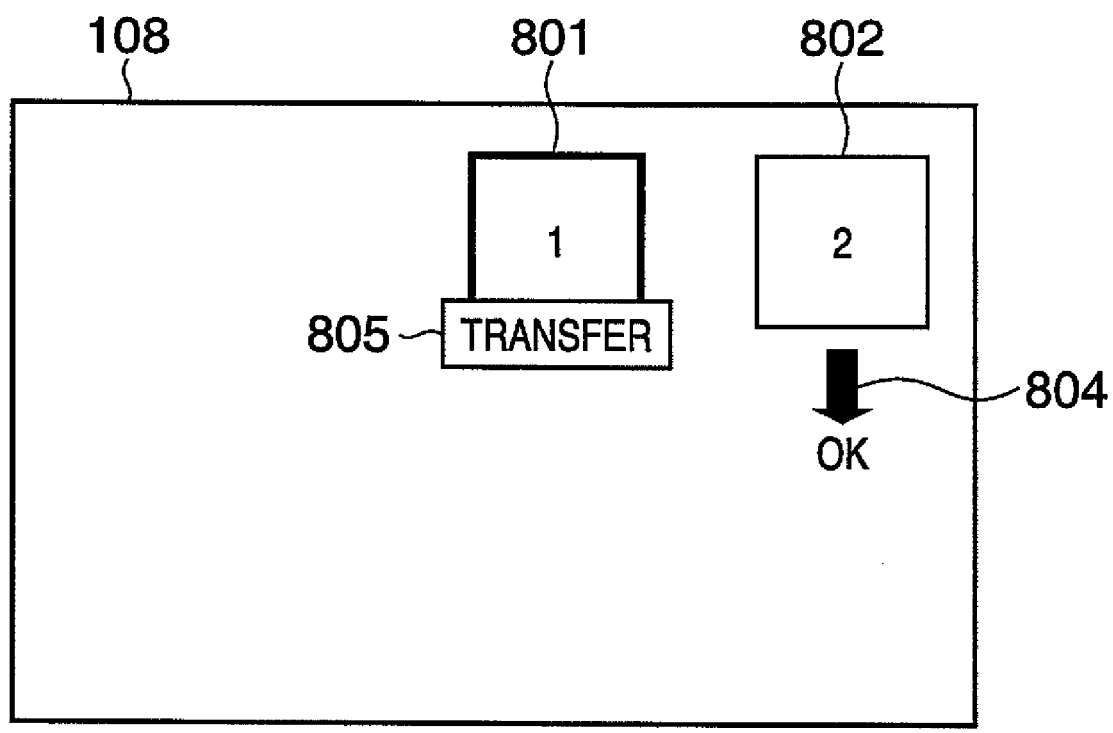
FIG. 10 is a view showing an example of a screen displayed on a display unit of a digital camera after step S510 in FIG. 4 is executed.

In step S510, the control unit 109 starts transferring the image data recorded in the storage medium 1 to the remote host unit. If the transfer has already been started, the transfer continues until all the image data is transferred. Further, if the exchange-OK indication of the storage medium 1 is displayed, the indication is turned off. This is because the storage medium 1 must not be exchanged during the transfer of the image data in the storage medium 1. The screen displayed in this case is shown in FIG. 10. Since the image data in the storage medium 1 is being transferred, an indication of transfer in progress 805 is displayed. Next, the control returns to step S501 and the similar processing is repeated.

When the control unit 109 determines in step S504 that the capacity of the storage medium 1 is full, step S511 is executed. In step S511, the control unit 109 assigns 2 to the value of FLG. Then the control proceeds to step S512 in FIG. 4B.

In step S512, the control unit 109 determines whether or not the capacity of the storage medium 2 is full, i.e., whether or not the storage medium 2 has enough space for recording the image data which has been recorded in the buffer 104 in step S502. If the storage medium is full, the control proceeds to step S513 in FIG. 4A; whereas if the storage medium is not full, the control proceeds to step S514.

In step S513, the control unit 109 assigns 1 to the value of FLG. Next, the control returns to step S503 and the similar processing is repeated.

Note that when the capacities of both storage media 1 and 2 are full, steps S504 in FIG. 4A to S512 in FIG. 4B go into an infinite loop. In this case, the storage medium where the exchange-OK indication is displayed is changed to break out of the infinite loop.

In step S514 in FIG. 48, the control unit 109 records the image data, which has been recorded in the buffer 104 in step S502 in FIG. 4A, in the storage medium 2 and deletes the image data from the buffer 104.

In step S515, the control unit 109 determines whether or not the image data recorded in the storage medium 1 is being transferred to the remote host unit by wireless communication. If so, the control proceeds to step S516; whereas if not, the control proceeds to step S518.

In step S516, the control unit 109 continues transferring of the image data recorded in the storage medium 1 to the remote host unit.

In step S517, the control unit 109 determines whether or not an image capturing designation, such as depression of the shutter 301, is received. If an image capturing designation is received, the control returns to step S502 in FIG. 4A and the similar processing is repeated. If an image capturing designation is not received, the control returns to step S515 in FIG. 4B and the similar processing is repeated.

When the control unit 109 determines in step S515 that the image data recorded in the storage medium 1 is not being transferred to the remote host unit by wireless communication, step S518 is executed. In step S518, the control unit 109 displays an exchange-OK indication of the storage medium 1 on, e.g., the display unit 108. If the exchange-OK indication has already been displayed, the indication display is continued.

In step S519, the control unit 109 starts transferring the image data recorded in the storage medium 2 to the remote host unit. If the transfer has already been started, the transfer continues until all the image data is transferred. Further, if the exchange-OK indication of the storage medium 2 is displayed, the indication is turned off. This is because the storage medium 2 must not be exchanged during the transfer of the image data in the storage medium 2. Next, the control returns to step S501 in FIG. 4A and the similar processing is repeated.

Figure 11:
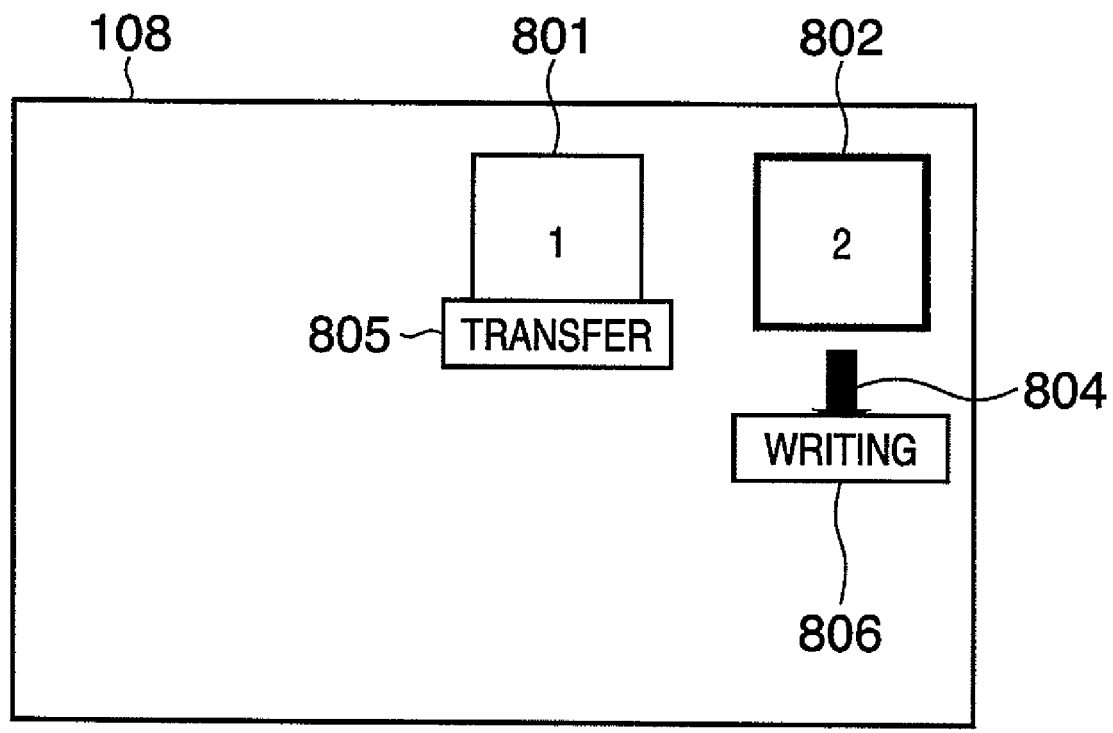
FIG. 11 is a view showing an example of a display for notifying a user that image data is being recorded in a storage medium.

Note that even if the exchange-OK indication is displayed, for instance during image data recording in the storage medium 2, the storage medium 2 must not be exchanged as a matter of course. This also applies to the storage medium 1. In this case, the control unit 109 displays a message indicative of recording in progress superimposing on the exchange-OK indication. Numeral 806 in FIG. 11 shows an example thereof.

By the above-described processing, image capturing and image data transfer of the digital camera 200 are realized. Note that in wireless communication, needless to say, necessary data other than image data, such as control data, may be transmitted and received between the digital camera 200 and the remote host unit.

Furthermore, it should be noted that, in a case where the storage medium 1 or 2 holds untransferred image data, the transfer started in step S510 in FIG. 4A or 5519 in FIG. 4B is performed in parallel with execution of any other steps.

As described above, according to the present embodiment, each time one of the storage media 1 and 2 exhausts its capacity, the digital camera 200 switches the image data recording destination from one to the other. While one of the storage media is used as an image data recording destination, image data in the other storage medium is transferred to the remote host unit by wireless communication.

By virtue of this processing, a user is able to continue image capturing even if the capacity of one of the storage media becomes full during image data transfer to the remote host unit.

Note that, as mentioned above, also in a case where the digital camera 200 has three or more media slots, the storage medium serving as an image data recording destination is similarly switched, thereby achieving the similar effects.

Second Embodiment

According to the first embodiment, a user can continue image capturing even if one of the storage medium (e.g., storage medium 1) exhausts its capacity, but cannot exchange the storage medium 1 until image data transfer is completed. On the contrary, according to the second embodiment, the storage medium 1 becomes exchangeable as soon as the storage medium 1 exhausts its capacity.

Note that since the present embodiment can adopt the same configuration and image capturing preparation processing of the digital camera 200 as that of the first embodiment (FIGS. 1 to 3), descriptions thereof are omitted.

<Processing Flow of Image Capturing>

Figure 5A:
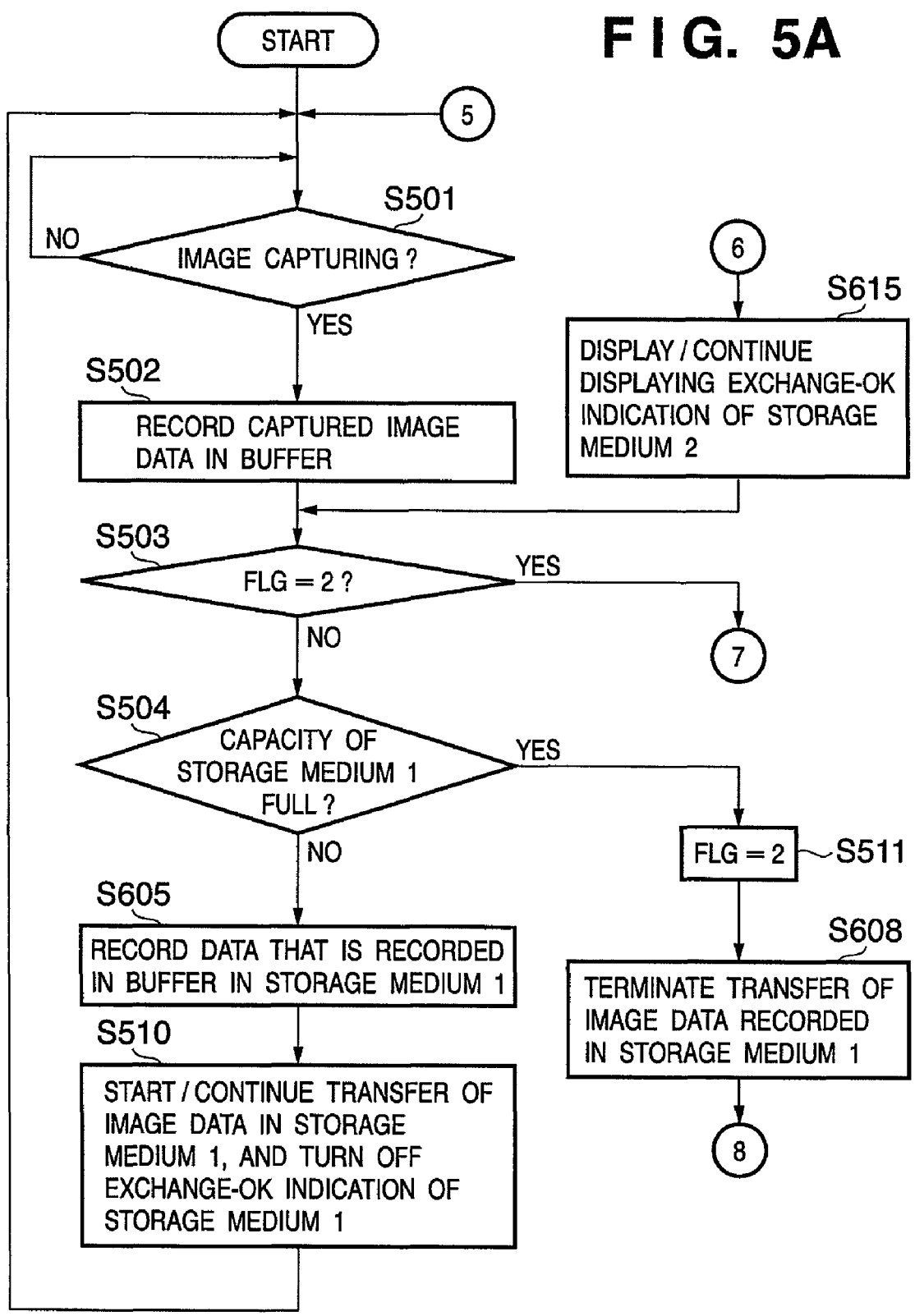
FIGS. 5A and 5B are a flowchart describing image capturing processing by a digital camera according to the second embodiment.
Figure 5B:
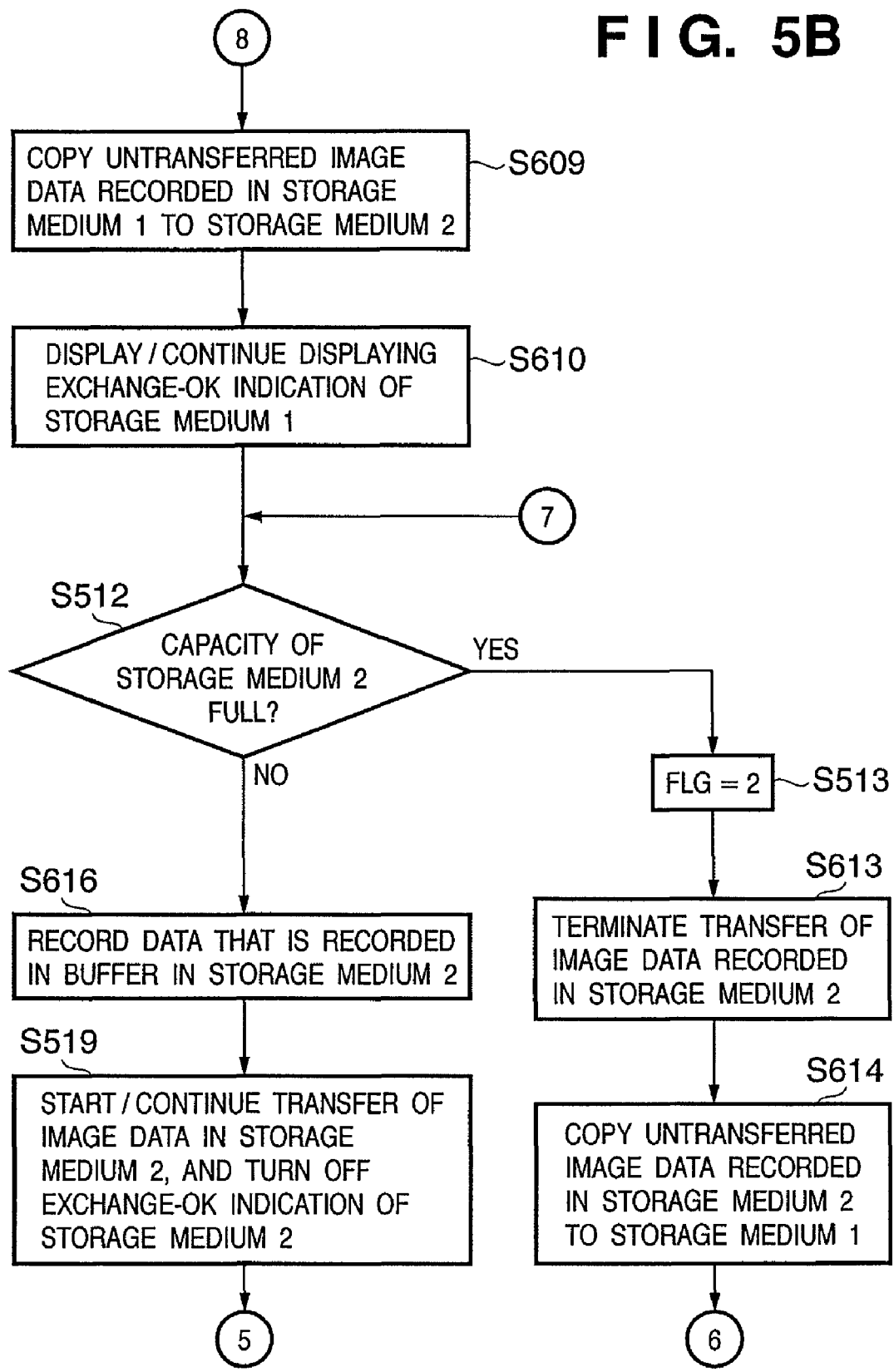

FIGS. 5A and 5B are a flowchart describing image capturing processing by the digital camera 200 according to the second embodiment. To the steps that execute identical processing to that of the flowchart in FIGS. 4A and 4B, the same reference numerals are assigned and descriptions thereof are omitted.

In step S605, the same processing as that of step S505 is performed. However, the control proceeds not to step S506 but to step S510. In other words, according to the present embodiment, in a case where the storage medium 1 is the image data recording destination, the control unit 109 does not determine whether or not image data recorded in the storage medium 2 is being transferred to the remote host unit.

In step S608, the control unit 109 terminates the transfer of the image data recorded in the storage medium 1 to the remote host unit. If the transfer has already been completed, no processing is performed in this step. Then the control proceeds to step S609 in FIG. 5B.

In step S609, the control unit 109 copies image data recorded in the storage medium 1, which has not been transferred to the remote host unit, to the storage medium 2.

In step S610, the control unit 109 displays an exchange-OK indication of the storage medium 1. If the exchange-OK indication has already been displayed, the indication display is continued.

As is apparent from steps S608 in FIG. 5A to S610 in FIG. 5B, according to the present embodiment, if it is determined in step S504 that the capacity of the storage medium 1 is full, the transfer of the image data recorded in the storage medium 1 to the remote host unit is terminated. The image data that has not been transferred to the remote host unit is copied to the storage medium 2. By virtue of this processing, in a case where the capacity of the storage medium 1 becomes full, unlike the first embodiment the storage medium 1 become immediately exchangeable. Also in a case where the capacity of the storage medium 2 becomes full, the same effect is achieved as will be described with reference to steps S613 in FIG. 5B to S615 in FIG. 5A.

Note that, in steps S510 and S519 of the present embodiment, it is preferable to configure the digital camera 200 in a way that, when the image data transfer is started, the image data copied from the storage medium that has become full is transferred first.

In step S613 in FIG. 5B, the control unit terminates the transfer of the image data recorded in the storage medium 2 to the remote host unit. If the transfer has already been completed, no processing is performed in this step.

In step S614, the control unit 109 copies image data recorded in the storage medium 2, which has not been transferred to the remote host unit, to the storage medium 1. Then the control proceeds to step S615 in FIG. 5A.

In step S615, the control unit 109 displays an exchange-OK indication of the storage medium 2. If the exchange-OK indication has already been displayed, the indication display is continued.

In step S616 in FIG. 5B, the same processing as that of step S514 is performed. However, the control proceeds not to step S515 but to step S519. In other words, according to the present embodiment, in a case where the storage medium 2 is the image data recording destination, the control unit 109 does not determine whether or not image data recorded in the storage medium 1 is being transferred to the remote host unit.

By the above-described processing, image capturing and image data transfer of the digital camera 200 are realized. Note that in wireless communication, necessary data other than image data, such as control data, may be transmitted and received between the digital camera 200 and the remote host unit, as mentioned in the first embodiment.

Furthermore, in a case where the storage medium 1 or 2 holds untransferred image data, the transfer started in step S510 or 5519 is performed in parallel with execution of any other steps, as similar to the first embodiment. However, it should be noted that in a case where the image data transfer is terminated in step S608 or S613, image data transfer is not performed in parallel.

As described above, according to the present embodiment, each time one of the storage media 1 and 2 exhausts its capacity, the digital camera 200 switches the image data recording destination from one to the other. In this stage, the transfer of the image data stored in the storage medium that has become full is terminated.

By virtue of this processing, in a case where the capacity of one of the storage media becomes full, the storage medium can be exchanged immediately.

Note that, as mentioned in the first embodiment, also in a case where the digital camera 200 has three or more media slots, the storage medium serving as an image data recording destination is similarly switched, thereby achieving the similar effects.

Third Embodiment

According to the first and second embodiments, the captured image data is only recorded in either the storage medium 1 or 2. On the contrary, the third embodiment describes a case where one same image data is recorded in both storage media 1 and 2.

This enables generation of a backup storage medium. Even if image data in one of the storage media is lost due to damage or the like, the same image data can be acquired from the other storage medium. This is particularly advantageous in an important scene where the same image can never be captured, such as a wedding.

Therefore, the present embodiment is characterized in that a user can continue image capturing even if the capacity of the storage medium becomes full, and that generation of a backup storage medium can be realized.

Note that since the present embodiment can adopt the same configuration and image capturing preparation processing of the digital camera 200 as that of the first embodiment (FIGS.

1 to 3), descriptions thereof are omitted. Note, the variable FLG is not used in the present embodiment, and step S403 in FIG. 3 is not executed.

<Processing Flow of Image Capturing>

Figure 6A:
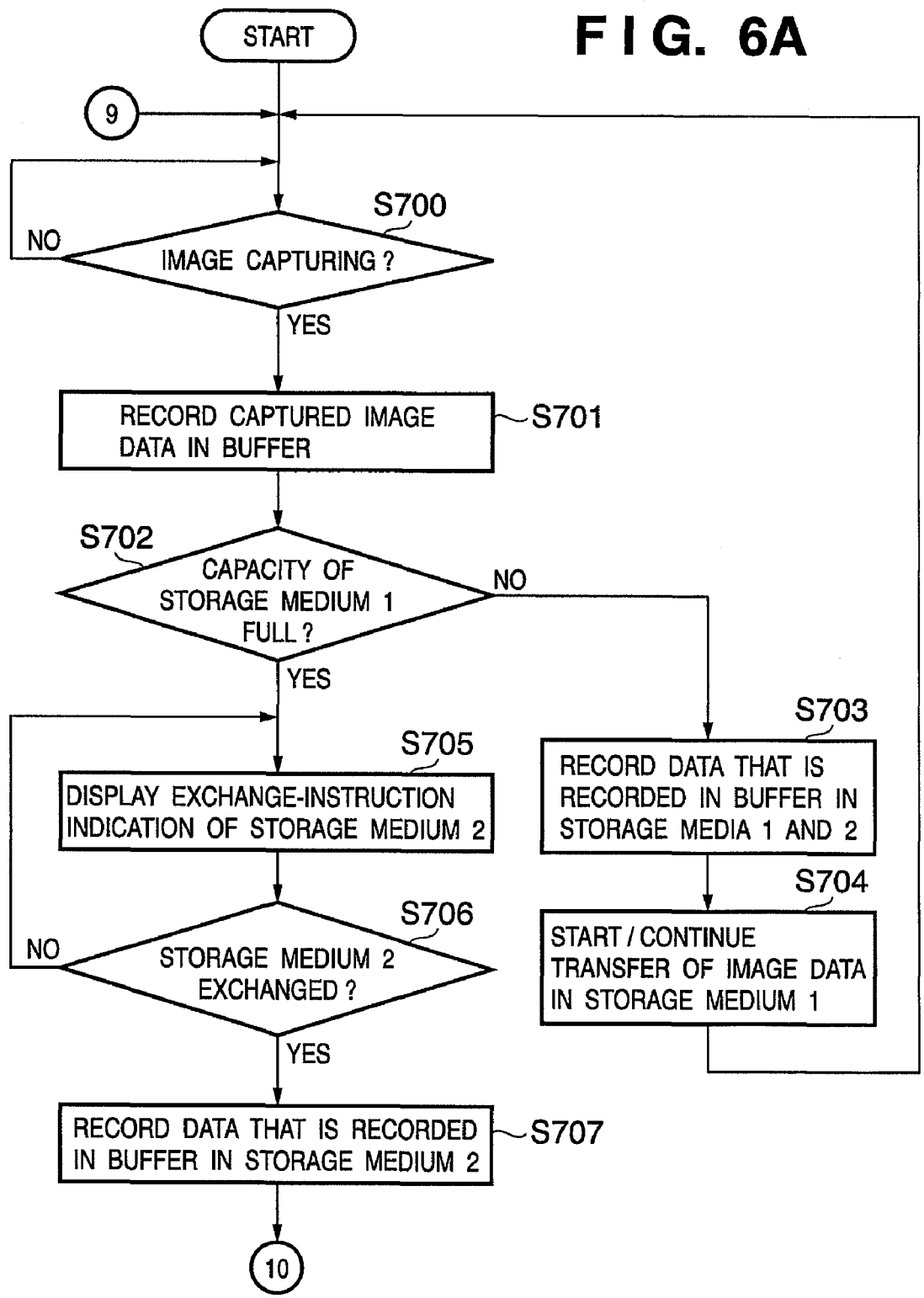
FIGS. 6A and 6B are a flowchart describing image capturing processing by a digital camera according to the third embodiment.
Figure 6B:
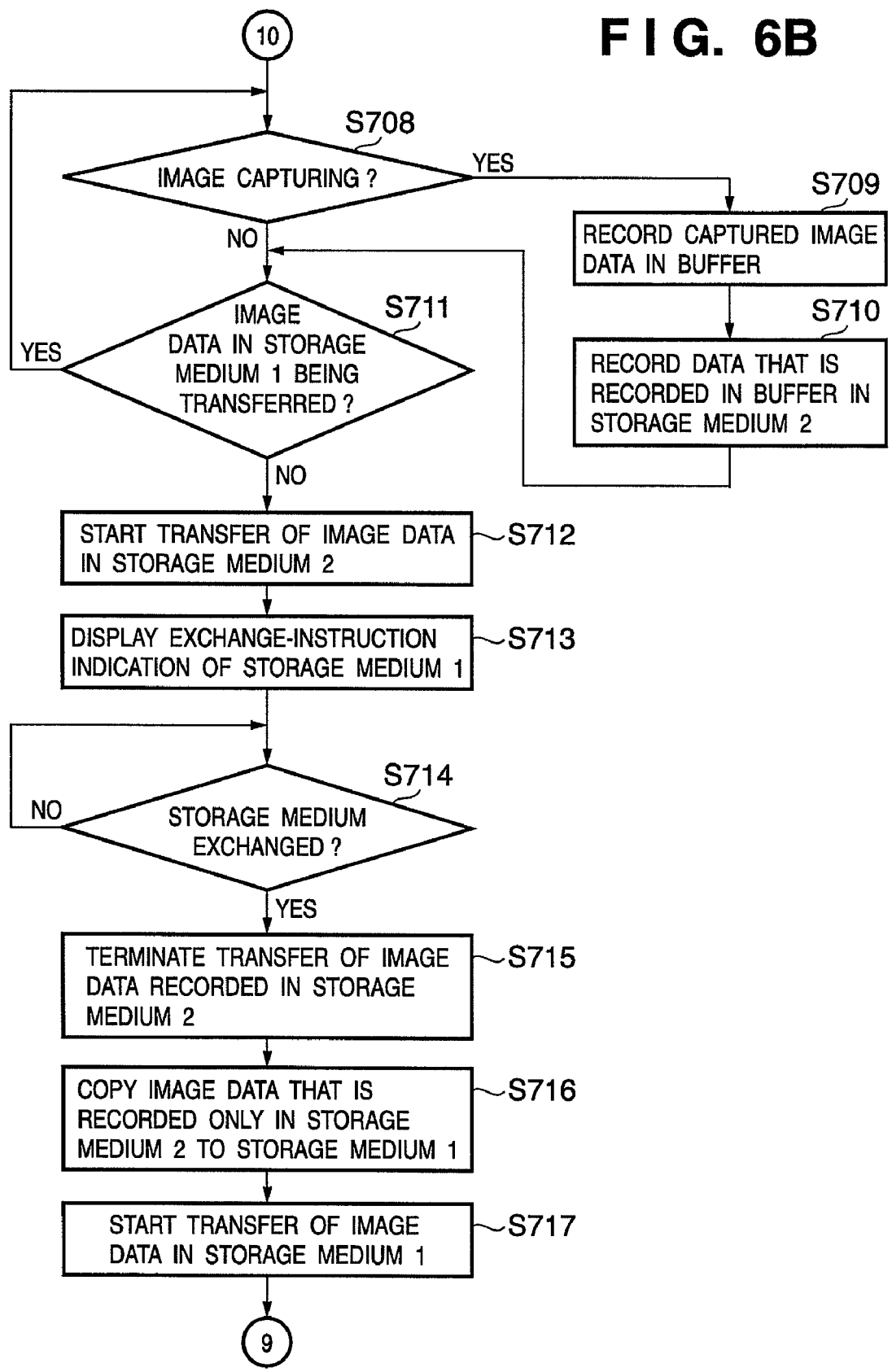

FIGS. 6A and 6B are a flowchart describing image capturing processing by the digital camera 200 according to the third embodiment. Note, the present embodiment is described assuming that the capacity of the storage medium 1 is the same or smaller than that of the storage medium 2. In a case where the capacity of the storage medium 1 is larger than that of the storage medium 2, the storage media 1 and 2 may be switched in the flowchart. Alternatively, instead of determining the capacities of the storage media 1 and 2, step S702 which will be described later may determine whether or not the capacity of the storage medium 2 is full in addition to the storage medium 1.

In step S700, the control unit 109 waits for reception of an image capturing designation such as depression of the shutter 301 or the like.

In step S701, the control unit 109 records captured image data in the buffer 104.

In step S702, the control unit 109 determines whether or not the capacity of the storage medium 1 is full. If the storage medium 1 is full, the control proceeds to step S705; whereas if the storage medium, 1 is not full, the control proceeds to step S703.

In step S703, the control unit 109 records the image data, which has been recorded in the buffer 104 in step S701, in both the storage media 1 and 2, and deletes the image data from the buffer 104.

In step S704, the control unit 109 starts transferring the image data recorded in the storage medium 1 to the remote host unit. If the transfer has already been started, the transfer is continued until all the image data is transferred. Then the control returns to step S700 and the similar processing is repeated.

In step S705, the control unit displays, e.g., on the display unit 108, an indication that instructs a user to exchange the storage medium 2 (exchange-instruction indication).

In step S706, the control unit 109 waits for the storage medium 2 to be exchanged.

In step S707, the control unit 109 records the image data, which has been recorded in the buffer 104 in step S701, only in the storage medium 2 unlike step S703, and deletes the image data, from the buffer 104. Then the control proceeds to step S708 in FIG. 6B.

In step S708, the control unit 109 determines whether or not an image capturing designation, such as depression of the shutter 301, is received. If an image capturing designation is received, the control proceeds to step S709; whereas if a designation is not received, the control proceeds to step S711.

In step S709, the control unit 109 records the captured image data in the buffer 104.

In step S710, the control unit 109 records the image data, which has been recorded in the buffer 104 in step S709, only in the storage medium 2 as similar to step S707, and deletes the image data from the buffer 104.

In step S711, the control unit 109 determines whether or not image data recorded in the storage medium 1 is being transferred to the remote host unit by wireless communication. If so, the control returns to step S708 and the similar processing is repeated. If not, that is, if the transfer started in step S704 is completed, the control proceeds to step S712 in FIG. 6B.

In step S712, the control unit 109 starts transferring the image data recorded in the storage medium 2 to the remote host unit.

In step S713, the control unit 109 displays an exchange-instruction indication of the storage medium 1.

In step S714, the control unit 109 waits for the storage medium 1 to be exchanged.

In step S715, the control unit 109 terminates the transfer of the image data recorded in the storage medium 2 to the remote host unit, which has been started in step S712.

In step S716, the control unit 109 copies the image data, which has been recorded only in the storage medium 2 in step S710 and S707 in FIG. 6A, to the storage medium 1.

In step S717, the control unit 109 starts transferring the image data recorded in the storage medium 1 to the remote host unit. In this stage, the image data that has already been transferred to the remote host unit in steps S712 to S715 does not have to be transferred again. Next, the control returns to step S700 in FIG. 6A and the similar processing is repeated.

By the above-described processing, image capturing and image data transfer of the digital camera 200 are realized. Note that in wireless communication, necessary data other than image data, such as control data, may be transmitted and received between the digital camera 200 and the remote host unit, as similar to the first embodiment.

Furthermore, as similar to the first embodiment, in a case where the storage medium 1 or 2 holds untransferred image data, the transfer started in step S704 in FIG. 6A, S712 in FIG. 6B, or S717 in FIG. 6B is performed in parallel with execution of any other steps. However, it should be noted that in a case where the image data transfer is terminated in step S715 in FIG. 68, image data transfer is not performed in parallel.

As described above, according to the present embodiment, the digital camera 200 records image data both in the storage media 1 and 2 in principle. When the capacity of the storage medium 1 becomes full and the storage medium 1 still holds untransferred image data, the digital camera 200 records image data only in the storage medium 2. When transferring of the image data recorded in the storage medium 1 is completed, the digital camera 200 copies the image data that has been recorded only in the storage medium 2 to an exchanged storage medium 1. Then again image data is recorded in both the storage media 1 and 2 until the capacity of the storage medium 1 becomes full.

By virtue of this processing, a user is able to continue image capturing even if the capacity of the storage medium becomes full, and it is possible to realize generation of a backup storage medium.

Note that, as mentioned above in the first embodiment, also in a case where the digital camera 200 has three or more media slots, the similar effects can be achieved. In this case, image data is recorded in at least two of the storage media in step S703. In step S710, image data may be recorded in a storage medium excluding the storage medium 1, from the storage medium in which image data is recorded in step S703.

Other Embodiment

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy (registered trademark) disk, a hard disk, an optical disk, a magnetooptical disk and the like can be used for providing the program codes. Also, CD-ROM, CD-R, a magnetic tape, a nonvolatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-262984 filed on Sep. 9, 2005 which is hereby incorporated by reference herein in its entirety.

What is claimed is:

1. An image capturing apparatus comprising:
    a recording unit adapted to record captured image data in at least one of first and second storage media which are inserted;
    a first transfer unit adapted to transfer the image data recorded in the first storage medium to an external apparatus by wireless communication;
    a determination unit adapted to determine whether or not an available capacity of the first or second storage medium is less than a predetermined value;
    a first recording control unit adapted to, in a case where neither the available capacity of the first nor second storage medium is less than the predetermined value as a result of the determination, control said recording unit to record the image data in both the first and second storage media; and
    a first exchange instruction unit adapted to instruct a user to exchange the second storage medium in a case where the available capacity of at least one of the first and second storage media is less than the predetermined value as a result of the determination,
    wherein the instruction by said first exchange instruction unit can be executed in parallel with the transfer executed by said first transfer unit.

2. The image capturing apparatus according to claim 1, further comprising a second recording control unit adapted to control said recording unit to record the image data only in the second storage medium after the second storage medium is exchanged by the user.

3. The image capturing apparatus according to claim 2, further comprising a second exchange instruction unit adapted to instruct the user to exchange the first storage medium in a case where the second storage medium is exchanged by the user and thereafter said first transfer unit completes transfer of the image data recorded in the first storage medium.

4. The image capturing apparatus according to claim 3, further comprising a copying unit adapted to, after the first storage medium is exchanged by the user, copy the image data recorded only in the second storage medium by said recording unit in accordance with the second recording control unit to the first storage medium that has been exchanged.

5. The image capturing apparatus according to claim 4, wherein in a case where the first storage medium is exchanged by the user and copying is performed by said copying unit, said first transfer unit transfers the image data recorded in the first storage medium.

6. The image capturing apparatus according to claim 1, further comprising a second transfer unit adapted to transfer the image data recorded in the second storage medium to an external apparatus by wireless communication,
    wherein in a case where the second storage medium is exchanged by the user and thereafter said first transfer unit completes transfer of the image data recorded in the first storage medium, said second transfer unit transfers the image data recorded in the second storage medium.

7. An image capturing method comprising the steps of:
    recording captured image data in at least one of first and second storage media which are inserted;
    transferring the image data recorded in the first storage medium to an external apparatus by wireless communication;
    determining whether or not an available capacity of the first or second storage medium is less than a predetermined value;
    in a case where neither the available capacity of the first nor second storage medium is less than the predetermined value as a result of the determination, controlling said recording to record the image data in both the first and second storage media; and
    instructing a user to exchange the second storage medium in a case where the available capacity of at least one of the first and second storage media is less than the predetermined value as a result of the determination,
    wherein said instructing a user to exchange the second storage medium can be executed in parallel with said wireless communication transfer of the image data recorded in the first storage medium to the external apparatus.

8. A computer-executable program stored in a non-transitory computer-readable storage medium, for causing a computer to execute the steps of:
    recording captured image data in at least one of first and second storage media which are inserted;
    transferring the image data recorded in the first storage medium to an external apparatus by wireless communication;
    determining whether or not an available capacity of the first or second storage medium is less than a predetermined value;
    in a case where neither the available capacity of the first nor second storage medium is less than the predetermined value as a result of the determination, controlling said recording to record the image data in both the first and second storage media; and
    instructing a user to exchange the second storage medium in a case where the available capacity of at least one of the first and second storage media is less than the predetermined value as a result of the determination,
    wherein said instructing a user to exchange the second storage medium can be executed in parallel with said wireless communication transfer of the image data recorded in the first storage medium to the external apparatus.

9. A non-transitory computer-readable storage medium having stored thereon a computer-executable program, which, when executed by a computer, executes the steps of:

recording captured image data in at least one of first and second storage media which are inserted;

transferring the image data recorded in the first storage medium to an external apparatus by wireless communication;

determining whether or not an available capacity of the first or second storage medium is less than a predetermined value;

in a case where neither the available capacity of the first nor second storage medium is less than the predetermined value as a result of the determination, controlling said recording to record the image data in both the first and second storage media; and instructing a user to exchange the second storage medium in a case where the available capacity of at least one of the first and second storage media is less than the predetermined value as a result of the determination, wherein said instructing a user to exchange the second storage medium can be executed in parallel with said wireless communication transfer of the image data recorded in the first storage medium to the external apparatus.

* * * * *